United States Patent [19]

Röhrle

[11] Patent Number: 5,394,802
[45] Date of Patent: Mar. 7, 1995

[54] IGNITER MECHANISM FOR A PYROTECHNICAL GAS GENERATOR

[75] Inventor: Martin Röhrle, Mutlangen, Germany

[73] Assignee: TRW Repa GmbH, Alfdorf, Germany

[21] Appl. No.: 234,480

[22] Filed: Apr. 28, 1994

[30] Foreign Application Priority Data

Apr. 30, 1993 [DE] Germany .................. 43 14 348.2

[51] Int. Cl.⁶ .................. F42C 1/04; B60R 21/32
[52] U.S. Cl. .................. 102/274; 280/734
[58] Field of Search .................. 102/274, 272, 275.11; 280/734, 806

[56] References Cited

U.S. PATENT DOCUMENTS

| | | | |
|---|---|---|---|
| 3,638,501 | 2/1972 | Prachar | 102/272 |
| 4,889,068 | 12/1989 | Tabata et al. | 102/274 |
| 4,938,140 | 7/1990 | Kinoshita et al. | 102/274 |
| 5,149,128 | 9/1992 | Föhl | 280/734 |
| 5,197,757 | 3/1993 | Breed et al. | 280/734 |
| 5,279,227 | 1/1994 | Nishizawa | 102/274 |

Primary Examiner—David Brown
Attorney, Agent, or Firm—Tarolli, Sundheim & Covell

[57] ABSTRACT

The invention relates to an igniter mechanism for a pyrotechnical gas generator of a vehicle occupant restraining system in which either an impact member or the gas generator for actuating the belt tensioning action is pretensioned by at least one spring so that the spring loads the impact member in a first direction against a stop. In addition the spring counteracts movement of the impact member in a second direction as a result of the forces of inertia acting on acceleration of the vehicle by means of a force which grows until a center position is reached. Force conversion means are provided to convert a torque generated by said spring into an axial force applied to said impact member.

7 Claims, 1 Drawing Sheet

U.S. Patent    Mar. 7, 1995    5,394,802
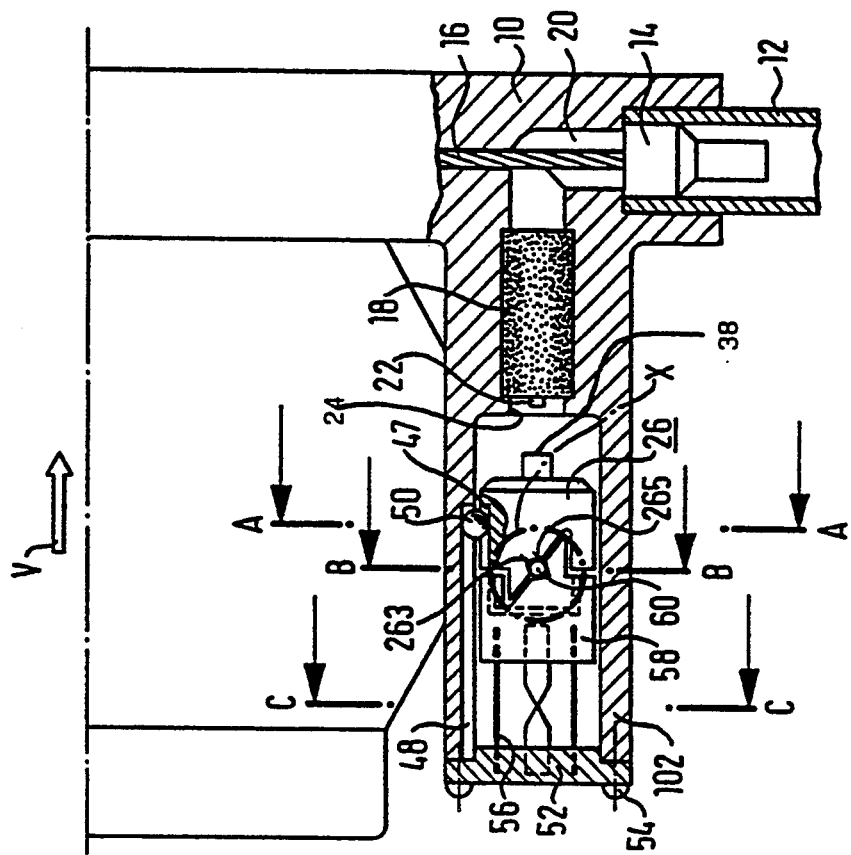
Fig.1
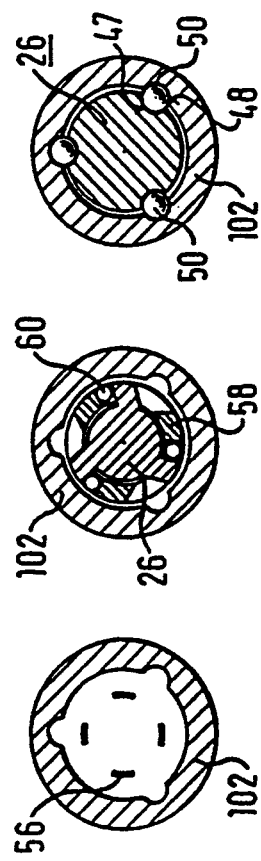
Fig.5
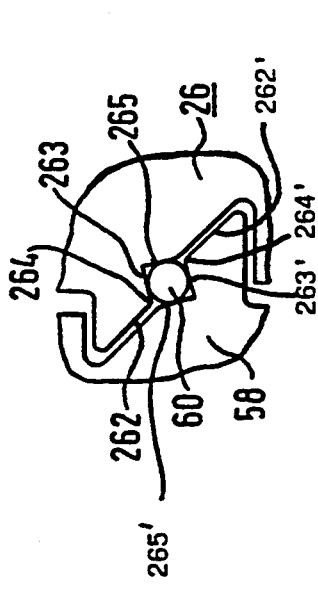
Fig.4
Fig.3
Fig.2

IGNITER MECHANISM FOR A PYROTECHNICAL GAS GENERATOR

The present invention relates to an igniter mechanism for a pyrotechnical gas generator.

One such igniter mechanism for a gas generator of a vehicle occupant restraining system is known from U.S. Pat. No. 3,601,081. This igniter mechanism is accommodated in a tee-shaped housing having two through-passages at right angles to each other. In one through-passage an impact member is provided assigned to an impact igniter of a gas generator and in the other through-passage one coil spring each is tensioned between a fully inserted screw and a ball-shaped force transmission member for the impact member. This ball-shaped force transmission member contacts the rear part of the impact member which also has the shape of a ball. Via an adjuster screw which at one end is in contact with the impact member and is screwed into the through-passage of the housing for the impact member, the location of the impact member with respect to the two spring-loaded force transmission members is adjustable. Due to the ball-shaped curvature of the two force transmission members and the rear part of the impact member, a control mechanism is provided such that movement of the impact member in the direction of an impact igniter of a gas generator as a result of the inertial forces effective in acceleration of the vehicle causes the spring load acting on the impact member to increase in a first direction towards the setscrew up to a center position and on exceeding the center position to reverse the effective direction of the spring load on the impact member. The impact member is then accelerated in a second direction towards the gas generator to trigger the impact igniter of the gas generator.

The present invention provides an igniter mechanism for a pyrotechnical gas generator in a vehicle occupant restraint system which igniter mechanism includes an impact member and a force transmitting member which can easily be manufactured with high reproducibility of the triggering conditions.

In the igniter mechanism according to the present invention, the gas generator comprises an impact igniter and is accommodated in a housing which is to be attached on the vehicle bodywork. The igniter mechanism further comprises an impact member movable in an axial direction of and within said housing between a rest position and a striking position on said impact igniter, said impact member being guided in said housing to prevent rotation thereof about a longitudinal axis, a force transmitting member mounted in said housing so as to be rotatable about said longitudinal axis and biasing means acting between said housing and said force transmitting member to bias said member in rotation about said axis, said force transmitting member and said impact member being coupled with each other by force conversion means.

Said force conversion means convert rotation of said force transmitting member caused by said biasing means into an axial movement of said impact member away from said impact igniter. Furthermore, said conversion means convert vehicle-sensitive axial movement of said impact member in the direction towards said impact igniter into a rotational movement of said force transmitting member against said biasing means. Additionally, said force conversion means convert rotation of said force transmitting member caused by said biasing means into a forced axial movement of said impact member against said impact igniter after said impact member has moved axially towards said impact igniter beyond a predetermined point.

This accordingly results in advantageous design possibilities of reducing the size and adjusting the actuation conditions according to the particular application.

In an advantageous practical embodiment of the invention, said force conversion means are formed by at least one pair of cam surfaces on said impact member and force transmitting member which are inclined in opposite directions with respect to said longitudinal axis and by a roller body engaged with both of said cam surfaces.

In accordance with yet a further advantageous embodiment, a plurality of said cam surface pairs are provided on mutually facing surfaces of said impact member and said force transmitting member.

Preferably, each cam surface may be formed by one of the surfaces of a V-shaped notch, wherein part of said roller body is accommodated.

In accordance with yet a further advantageous embodiment, said force transmitting member may be restrained from axial movement in said housing.

In a further practical embodiment, said housing means may be formed by at least one twisted leaf spring connected between said housing and an end of said force transmitting member opposite said impact member. Thus, the spring generates a torque which is converted by said force conversion means into an axial force acting on the impact member.

In accordance with yet a further advantageous embodiment, each of said force transmitting members and said impact member may be generally piston-shaped and coaxially accommodated in a cylindrical bore of said housing.

By choosing the strength of said biasing means and the slope of the respective cam surfaces in a suitable manner, sufficiently large acceleration forces can be achieved with limited rotational deflection.

Further features and advantages of the invention will be evident from the description of a preferred embodiment of the invention with reference to the drawing in which:

FIG. 1 is a sectional view through an igniter mechanism according to an embodiment of the invention;

FIG. 2 is a sectional view along the line C—C of FIG. 1;

FIG. 3 is a sectional view along the line B—B of FIG. 1;

FIG. 4 is a sectional view along the line A—A of FIG. 1; and

FIG. 5 is a detail view along the line X of FIG. 1.

One embodiment of an igniter mechanism according to the present invention is illustrated in the FIGS. 1 through 5. On a housing of a belt retractor a housing block or housing base 10 is provided for a pyrotechnical belt tensioning drive. In the housing base 10 a cylinder 12 housing a piston 14 connecting a tensioning cable 16 is provided slidably mounted in a suitably formed opening. In an opening of the housing base 10 a pyrotechnical gas generator 18 is also provided which is connected to the cylinder 12 via a passage 20. On the side of the gas generator 18 facing away from the passage 20 an impact igniter 22 is provided for actuating the gas generator 18. In the illustrated embodiment, the gas generator and the cylinder 12 are arranged at right angles to each other; however, they can also be coaxially aligned.

The housing base 10 has an opening 24 into which the impact igniter 22 of the gas generator 18 protrudes so as to be accessible for an impact member 26 assigned and located opposite to the impact igniter 22. The impact member 26 can be axially shifted in the direction of the impact igniter 22. The housing base 10 is provided with a cylindrical part 102 connecting the generator 18. In this cylindrical part 102 of the housing base 10 the piston-shaped impact member 26 is mounted non-rotatable. The impact member 26 is provided with a groove 47, and a groove 48 opposite said groove 46 is provided in the part 102. In the passage formed by these grooves 46 and 48 a ball 50 is arranged, resulting in the impact member 26 being mounted non-rotatable in the part 102. However, the impact member 26 is slidably mounted in the axial direction. As is particularly evident from FIG. 4, three pairs of grooves 47 and 48 each offset by 120° circumferentially are provided with balls 50.

At the end of the cylindrical part 102 of the housing base 10 a cover 52 is secured in place by connecting elements 54. In the cover 52 springs 56 are incorporated which extend into the cylindrical part which engage at their other end a force transmitting member 58 which is also piston-shaped. Said force transmitting member 58 and said impact member 26 are coupled with each other by force conversion means 262, 263, 265, 262', 263', 265', 60, which (i) convert rotation of said force transmitting member 58 caused by said springs 56 into an axial movement of said impact member 26 away from said impact igniter 22, (ii) convert vehicle-sensitive axial movement of said impact member 26 in the direction towards said impact igniter 22 into a rotational movement of said force transmitting member 58 against said springs 56 and (iii) convert rotation of said force transmitting member 58 caused by said springs 56 into a forced axial movement of said impact member 26 against said impact igniter 22 after said impact member 26 has moved axially towards said impact igniter 22 beyond a predetermined point 264, 264'. Thus, the torque generated by the springs 56 is converted into an axial force acting on said impact member 26.

In order to achieve this, the force transmitting member 58 is rotatably mounted in said housing 10, whereas it is at least essentially restrained from axial movement by said springs 56. The force conversion means comprise at least one control region between said force transmitting member 58 and said non-rotatable and axially slidable impact member 26. Each control region comprises a pair of cam surfaces associated with said impact member 26 and said force transmitting member 58, respectively. A respective cam surface associated with said impact member 26 comprises cam surface portions 262, 263, 265, whereas the corresponding cam surface associated with said force transmitting member 58 comprises cam surface portions 262', 263', 265'. These cooperating cam surfaces serve as contact surfaces for a force transmitting element 60 which is provided between said force transmitting member 58 and said impact member 26. Said intermediate force transmitting element 60 is preferably formed by a roller body 60, especially by a ball or the like. The cam surface portions 262 and 263 of the cam surface associated with the impact member 26 are oriented inclined to each other. Thus, these two cam surface portions 262, 263 are differently inclined with respect to the longitudinal axis of the force transmitting member 58 and the impact member 26. The edge between the two cam surface portions 262 and 263 forms a predetermined or center point 264. Correspondingly, the two cam surface portions 262', 263' of the cam surface provided on the force transmitting member 58 are differently inclined, too, with a predetermined or center point 264' being defined between these two cam surface portions 262', 263'.

The springs 56 are pretensioned tangentially with respect to the longitudinal axis of the rotatable force transmitting member 58, thus generating said torque. This torque is converted in said control region into said axial force acting on said impact member 26 by means of said inclined cam surface portions 262', 263', 265' and 262, 263, 265, and by means of said intermediate roller body 60 contacting said cam surface portions.

Due to the inclined cam surface portions 263, 263' of the impact member 26 and the force transmitting member 58, respectively, which are first contacted by said roller body 60, the impact member 26 is drawn in FIGS. 1 and 5 towards the left side against a stop 265' of the force transmitting member 58, on which stop 265' the impact member 26 is supported with its cam surface portion 265 serving as an abutment via the roller body 60. The cam surface portions 265' and 265 forming said stop and said abutment, respectively, extend essentially perpendicular to the longitudinal axis of the force transmitting member 58 and the impact member 26. Thus, the springs 56 generate a restoring force by which the impact element 26 is held in an initial or rest position, distant from the impact igniter 22. In this initial or rest position of the impact member 26 the roller body 60 is forced against the cam surface portion 263 of the impact member 26 by the cam surface portion 263' of the force transmitting member 58.

If the vehicle is suddenly braked, the impact member 26 attempts to move in the direction of the impact igniter 22 of the gas generator 18 due to the occurring inertia forces. The direction of travel of the vehicle in which the igniter mechanism of the invention is incorporated is indicated by the arrow indentified as V. The roller body 60 thereby rolls along the inclined cam surface portions 263, 263' toward the predetermined point, whereby the force transmitting member 58 is rotated against the spring force and the torque preload is further increased.

Thus, due to the inclined cam surface portions 263, 263' of the impact member and 26 the force transmitting member 58, the axial restoring force is increased, too, since the roller body 60 is forced during its axial displacement up to the predetermined or center point 264, 264' by the inclined cam surface portion 263 of the impact member 26 against the cam surface portion 263' of the force transmitting member 58, with this cam surface portion 263' being inclined with respect to the longitudinal axis, too, with said force transmitting member 58 therefore being further rotated about the longitudinal axis against the spring force.

Once the predetermined or center points 264, 264' of the cam surface portions 262, 263; 262', 263' provided on said impact member 26 and said force transmitting member 58, respectively, are exceeded, the roller body 60 is no longer engaged with the cam surface portions 263, 263' generating the restoring force, whereby the impact member 26 is released from the force transmitting member 58.

The roller body 60 is now positioned between the cam surface portions 262, 262', the effective direction of the spring load thereby being inverted and the impact element 26 thereby being accelerated by the same springs 56 in the direction towards the impact igniter 22 of the gas generator 18 and separated from the force transmitting member 58. An anvil 38 is provided on the impact member 26 assigned to the impact igniter 22. Finally, the impact member 26 accelerated in such a way comes into contact with the impact igniter 22 of the gas generator 18 with its anvil 38, the gas generator 18 thereby being ignited and the belt tensioning procedure thereby being actuated in a known manner.

Therefore, the axial force applied on the impact member 26 by the force transmitting member 58 is inverted when the corresponding predetermined or center points 264, 264' are reached, with the spring force effecting the acceleration being further increased by the further tensioning of the springs until the predetermined points are reached.

However, if the vehicle acceleration is too low for such a triggering, the impact member is again forced back against the stop 265' after the inertia forces decrease, due to an increasing spring pretensioning up to the predetermined point and the resulting axial restoring force.

As illustrated in FIG. 2 four springs 56 are provided arranged offset from each other. It is, however, generally possible to provide two or more springs 56.

It can be seem from FIG. 3 that three control regions are provided in a single plane oriented perpendicular to the longitudinal axis of the impact member 26. These control regions are arranged at an angle of 120° circumferentially. By means of this embodiment of the invention, a compact configuration of the igniter mechanism is made possible which takes up little space.

In all embodiments the housing 10 may be engineered in aluminum or die-cast zinc or a similar material. Like the impact member 26 the roller 36 may also be fabricated of a sintered or steel material.

What is claimed is:

1. An igniter mechanism for a pyrotechnical gas generator in a vehicle occupant restraint system, the gas generator having an impact igniter and being accommodated in a housing which is to be attached on the vehicle bodywork, comprising an impact member movable in an axial direction of and within said housing between a rest position and a striking position on said impact igniter, said impact member being guided in said housing to prevent rotation thereof about a longitudinal axis, a force transmitting member mounted in said housing so as to be rotatable about said longitudinal axis and biasing means acting between said housing and said force transmitting member to bias said member in rotation about said axis, said force transmitting member and said impact member being coupled with each other by force conversion means which (i) convert rotation of said force transmitting member caused by said biasing means into an axial movement of said impact member away from said impact igniter, (ii) convert vehicle sensitive axial movement of said impact member in the direction towards said impact igniter into a rotational movement of said force transmitting member against said biasing means, and (iii) convert rotation of said force transmitting member caused by said biasing means into a forced axial movement of said impact member against said impact igniter after said impact member has moved axially towards said impact igniter beyond a predetermined point.

2. The igniter mechanism of claim 1, wherein said force transmitting member is restrained from axial movement in said housing.

3. The igniter mechanism of claim 1, wherein said biasing means are formed by at least one twisted leaf spring connected between said housing and an end of said force transmitting member opposite said impact member.

4. The igniter mechanism of claim 1, wherein said each of said force transmitting member and said impact member are generally piston-shaped and coaxially accommodated in a cylindrical bore of said housing.

5. The igniter mechanism of claim 1, wherein said force conversion means are formed by at least one pair of cam surfaces on said impact member and force transmitting member which are inclined in opposite directions with respect to said longitudinal axis and by a roller body engaged with both of said cam surfaces.

6. The igniter mechanism of claim 5, wherein a plurality of said cam surface pairs are provided on mutually facing surfaces of said impact member and said force transmitting member.

7. The igniter mechanism of claim 5, wherein each cam surface is formed by one of the surfaces of a V-shaped notch wherein part of said roller body is accommodated.

* * * * *